United States Patent
Ricci et al.

(10) Patent No.: US 9,782,631 B2
(45) Date of Patent: Oct. 10, 2017

(54) GOLF BALL COMPOSITIONS

(71) Applicant: Acushnet Company, Fairhaven, MA (US)

(72) Inventors: Shawn Ricci, New Bedford, MA (US); Brian Comeau, Berkley, MA (US); Michael Michalewich, Norton, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/986,105

(22) Filed: Dec. 31, 2015

(65) Prior Publication Data

US 2017/0189762 A1  Jul. 6, 2017

(51) Int. Cl.
*A63B 37/12* (2006.01)
*C08G 18/10* (2006.01)
*C08G 18/67* (2006.01)
*A63B 37/00* (2006.01)
*C08G 18/50* (2006.01)

(52) U.S. Cl.
CPC ...... *A63B 37/0027* (2013.01); *A63B 37/0031* (2013.01); *A63B 37/0033* (2013.01); *A63B 37/0043* (2013.01); *A63B 37/0045* (2013.01); *A63B 37/0063* (2013.01); *A63B 37/0064* (2013.01); *A63B 37/0065* (2013.01); *A63B 37/0076* (2013.01); *A63B 37/0092* (2013.01); *C08G 18/10* (2013.01); *C08G 18/5024* (2013.01); *C08G 18/6795* (2013.01)

(58) Field of Classification Search
CPC .............. C08G 18/3228; C08G 18/325; C08G 18/6795; C08G 18/5024
See application file for complete search history.

(56) References Cited

U.S. PATENT DOCUMENTS

| 2004/0225102 | A1* | 11/2004 | Rajagopalan | C08G 18/10 528/61 |
| 2005/0131194 | A1* | 6/2005 | Rajagopalan | C08G 18/10 528/61 |
| 2007/0082990 | A1* | 4/2007 | Bulpett | A63B 37/0003 524/291 |
| 2014/0234546 | A1 | 8/2014 | Verborgt et al. | |

* cited by examiner

*Primary Examiner* — David Buttner
(74) *Attorney, Agent, or Firm* — Mandi B. Milbank

(57) ABSTRACT

Disclosed herein are golf ball compositions formed from polyureas made from aminocrotonates.

12 Claims, No Drawings

GOLF BALL COMPOSITIONS

FIELD OF THE INVENTION

The present invention relates generally to golf balls having covers formed from compositions comprising polyureas derived from aminocrotonates.

BACKGROUND OF THE INVENTION

Polyurea and polyurethane compositions are known to be useful in forming golf ball layers, particularly cover layers, because they contribute to the desired feel and durability properties of the ball. However, very few of the commercially available amine-terminated materials are useful in producing golf ball compositions, because the vast majority of commercially available amines have reaction rates that are not conducive to the manufacturing processes used to form golf ball layers.

Thus, there remains a need for an improved polyurea golf ball composition having a cure profile that is particularly suitable for the processes used in forming golf ball layers. Such composition may additionally provide the layer formed therefrom with one or more of the following properties: improved elongation, improved tensile strength, improved chemical resistance, and increased adhesion to many different substrates.

SUMMARY OF THE INVENTION

The present invention is directed to a golf ball comprising a layer formed from a polyurea composition. The polyurea composition comprises a reaction product of a polyisocyanate prepolymer and an amine compound having the formula:

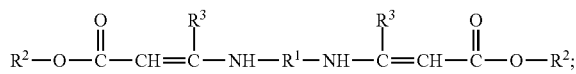

wherein $R^1$ is an organic group, $R^2$ is an aliphatic group, and $R^3$ is an aliphatic group.

DETAILED DESCRIPTION

Golf ball compositions of the present invention comprise the reaction product of a polyisocyanate prepolymer and an amine compound. The amine compound is an aliphatic polyamine, such as a Jeffamine, which has been chemically modified into a secondary amine, and contributes to an improved gel time and desirable mechanical properties of the polyurea reaction product made therefrom.

Amine Compound

The amine compound is formed by reacting a polyamine, optionally including ether groups, with one or more beta ketoesters or diketones, such as ethylacetoacetate, methylacetoacetate, t-butylacetoacetate, and acetylacetone, according to any known method for making ketimines. The general reaction is shown below:

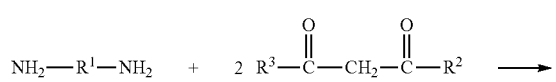

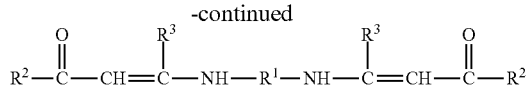

The product of reacting a polyamine with ethylacetoacetate is shown below:

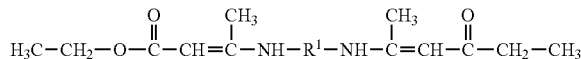

The product of reacting a polyamine with acetylacetone is shown below:

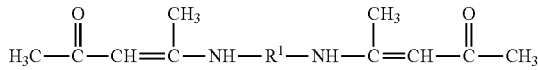

Suitable polyamines for forming the amine compound include any polyamine, or combination of two or more polyamines, capable of forming ketimines. Non-limiting examples of particularly suitable polyamines include primary polyamines, m-xylylene diamine, diethylene triamine, (2-aminoethoxy)-2-aminoethane, 2-(2-aminoethoxy)ethanol, 1,5-diamino-2-methylpentane, N-methyl-1,3-aminopropane, $NH_2(CH(CH_3)-CH_2-O)_x-CH_2-CH(CH_3)-NH_2$, $NH_2-(CH(CH_3)-CH_2-O)_x-(CH_2-CH_2-O)_y-(CH(CH_3)-CH_2-O)_z-CH_2-CH(Ch_3)-NH_2$, $NH_2-(CH_2)_x-O-CH_2-CH_2-CH_2-O)_x-NH_2$, and $NH_2-(CH(CH_3)-CH_2-O)_x-CH_2-CR[(CH_2)_n-(O-CH_2-CH)CH_3))_y-NH_2]-CH_2-(O-CH_2-CH(CH_3))_z-NH_2$, wherein n, x, y, and z are nonnegative numbers, including, but not limited to, 0, 1, 2, 3, 4, 5, 6, 7, 8, 9, 10, and higher values, and may represent average values of a mixture of such compounds.

Examples of particularly suitable commercially available polyamines include, but are not limited to, JEFFAMINE® D series amine-terminated polyoxypropylene glycols, JEFFAMINE® ED series polyether diamines based on a predominantly PEG backbone, JEFFAMINE® EDR series diamines with relatively high reactivity, and JEFFAMINE® T series propylene oxide-based triamines, all of which are commercially available from Huntsman Corporation.

Polyisocyanate Prepolymer

The polyisocyanate prepolymer is selected from polyurea prepolymers and polyurethane prepolymers. Polyurea prepolymers are the reaction product of an amine-terminated compound with an excess amount of an isocyanate. Polyurethane prepolymers are the reaction product of a polyol with an excess amount of an isocyanate.

Suitable isocyanates for forming the polyisocyanate prepolymer include aliphatic, cycloaliphatic, aromatic aliphatic, derivatives thereof, and combinations of two or more thereof having two or more isocyanate (NCO) groups per molecule. The isocyanate may be any isocyanate-functional monomer, dimer, trimer, or multimeric adduct thereof, prepolymer, quasi-prepolymer, or combination of two or more thereof. Suitable isocyanate-functional compounds also include any monoisocyanate or polyisocyanate that includes any isocyanate functionality of two or more.

Suitable diisocyanates include those having the general formula NCO—R—NCO, where R is preferably a cyclic or linear or branched hydrocarbon moiety containing from 1 to 20 carbon atoms. When multiple cyclic groups are present, linear and/or branched hydrocarbons containing from 1 to 10 carbon atoms can be present as spacers between the cyclic groups. In some cases, the cyclic group(s) may be substituted at the 2-, 3-, and/or 4-positions, respectively. Substituted groups may include, but are not limited to, halogens, primary, secondary, or tertiary hydrocarbon groups, or combinations thereof.

Non-limiting examples of particularly suitable unsaturated isocyanates, i.e., aromatic compounds, include 2,2'-, 2,4'-, and 4,4'-diphenylmethane diisocyanate (MDI); 3,3'-dimethyl-4,4'-biphenyl diisocyanate (TODI); toluene diisocyanate (TDI); polymeric MDI; carbodimide-modified liquid 4,4'-diphenylmethane diisocyanate; para-phenylene diisocyanate (PPDI); meta-phenylene diisocyanate (MPDI); triphenylmethane-4,4'-, and triphenylmethane-4,4"-triisocyanate; napthylene-1,5,-diisocyanate; 2,4'-, 4,4'-, and 2,2'-biphenyl diisocyanate; polyphenylene polymethylene polyisocyanate (PMDI) (also known as polymeric PMDI); and combinations of two or more thereof.

Non-limiting examples of particularly suitable saturated isocyanates include ethylene diisocyanate; propylene-1,2-diisocyanate; tetramethylene diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and combinations thereof; modified polyisocyanate derived from the above isocyanates and polyisocyanates; and combinations of two or more thereof.

In a particular embodiment, the isocyanate is MDI.

In embodiments wherein the polyisocyanate prepolymer is a polyurea prepolymer, suitable amine-terminated compounds for forming the prepolymer include amine-terminated hydrocarbons, amine-terminated polyethers, amine-terminated polyesters, amine-terminated polycarbonates, amine-terminated polycaprolactones, and combinations of two or more thereof. The molecular weight of the amine compound is generally in the range of about 100 to about 10,000. Suitable polyether amines include, but are not limited to, methyldiethanolamine; polyoxyalkylenediamines, such as, polytetramethylene ether diamines, polyoxypropylenetriamine, polyoxyethylene diamines, and polyoxypropylene diamines; poly(ethylene oxide capped oxypropylene) ether diamines; propylene oxide-based triamines; triethyleneglycoldiamines; glycerin-based triamines; and combinations of two or more thereof. Suitable additional amine-terminated compounds for forming the prepolymer include, but are not limited to, poly(acrylonitrile-co-butadiene); poly(1,4-butanediol) bis(4-aminobenzoate) in liquid or waxy solid form; linear and branched polyethylene imine; low and high molecular weight polyethylene imine having an average molecular weight of about 500 to about 30,000; poly(propylene glycol) bis(2-aminopropyl ether) having an average molecular weight of about 200 to about 5,000; polytetrahydrofuran bis (3-aminopropyl) terminated having an average molecular weight of about 200 to about 2000; and combinations of two or more thereof.

In a particular embodiment, the amine-terminated compound used to form the polyurea prepolymer is a polyether amine, such as JEFFAMINE® D2000 polyoxypropylenediamine, commercially available from Huntsman Corporation. In another particular embodiment, the amine-terminated compound used to form the polyurea prepolymer is a copolymer of polytetramethylene oxide and polypropylene oxide, such as that commercially available from Huntsman Corporation.

In embodiments wherein the polyisocyanate prepolymer is a polyurethane prepolymer, suitable polyols for forming the prepolymer include, but are not limited to, polyether polyols, polycaprolactone polyols, polyester polyols, polycarbonate polyols, and hydrocarbon polyols. The hydrocarbon chain of the polyol can have saturated or unsaturated bonds, or substituted or unsubstituted aromatic and cyclic groups.

Suitable polyether polyols include, but are not limited to, polytetramethylene ether glycol (PTMEG); copolymers of polytetramethylene ether glycol and 2-methyl-1,4-butane diol (PTG-L); poly(oxyethylene) glycol; poly(oxypropylene) glycol; ethylene oxide capped (polyoxypropylene) glycol; poly(oxypropylene oxyethylene) glycol; and combinations of two or more thereof.

Suitable polycaprolactone polyols include, but are not limited to, diethylene glycol initiated polycaprolactone; propylene glycol initiated polycaprolactone; 1,4-butanediol initiated polycaprolactone; 1,6-hexanediol initiated polycaprolactone; trimethylol propane initiated polycaprolactone; neopentyl glycol initiated polycaprolactone; polytetramethylene ether glycol initiated polycaprolactone; ethylene glycol initiated polycaprolactone; dipropylene glycol initiated polycaprolactone; and combinations of two or more thereof.

Suitable polyester polyols include, but are not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; o-phthalate-1,6-hexanediol polyester polyol; polyethylene terephthalate polyester polyols; and combinations of two or more thereof.

Suitable polycarbonate polyols include, but are not limited to, poly(phthalate carbonate) glycol, poly(hexamethylene carbonate) glycol, polycarbonate polyols containing bisphenol A, and combinations of two or more thereof.

Suitable hydrocarbon polyols include, but are not limited to, hydroxy-terminated liquid isoprene rubber (LIR), hydroxy-terminated polybutadiene polyol, hydroxy-terminated polyolefin polyols, hydroxy-terminated hydrocarbon polyols, and combinations of two or more thereof.

Other polyols that may be used to form the prepolymer include, but are not limited to, glycerols; castor oil and its derivatives; Polytail™ H and Polytail™ HA polyhydroxy polyolefin oligomers, commercially available from Mitsubishi Chemical; acrylic polyols; acid functionalized polyols based on a carboxylic, sulfonic, or phosphoric acid group; dimer alcohols converted from the saturated dimerized fatty acid; and combinations of two or more thereof.

Non-limiting examples of suitable polyols based on a hydrophobic backbone include hydrocarbon polyols, hydroxy-terminated polybutadiene polyols, polyethers, polycaprolactones, and polyesters.

In a particular embodiment, the polyol used to form the polyurethane prepolymer is PTMEG.

A catalyst is optionally employed to promote the reaction between the amine-terminated compound or polyol and the isocyanate. Suitable catalysts include, but are not limited to bismuth catalysts; zinc octoate; stannous octoate; tin catalysts, e.g., bis-butyltin dilaurate, bis-butyltin diacetate, stannous octoate, tin (II) chloride, tin (IV) chloride, bis-butyltin dimethoxide, dimethyl-bis[1-oxonedecyl)oxy]stannane, and di-n-octyltin bis-isooctyl mercaptoacetate; amine catalysts, e.g., triethylenediamine, triethylamine, and tributylamine; organic acids, e.g., oleic acid and acetic acid; delayed catalysts, e.g., Polycat® catalysts, commercially available from Air Products and Chemicals, Inc.; and combinations of two or more thereof.

Polyureas

Polyureas of the present invention are formed from the reaction of a polyisocyanate prepolymer and an amine compound such that urea groups are formed from the isocyanate groups of the prepolymer and the NH groups of the amine compound. In a particular embodiment, 50 mol % or more of the isocyanate prepolymer molecules reacting with the amine compound are aromatic. In another particular embodiment, 80 mol % or more of the isocyanate prepolymer molecules reacting with the amine compound are aromatic.

Because the polyisocyanate prepolymer can be either a polyurea prepolymer or a polyurethane prepolymer, the term polyurea, when used in reference to the product formed from reacting the prepolymer and the amine compound, includes polyureas and polyurethane-urea hybrids.

The general reaction of a polyisocyanate prepolymer and an amine compound, particularly a diamine with a diisocyanate, is shown below:

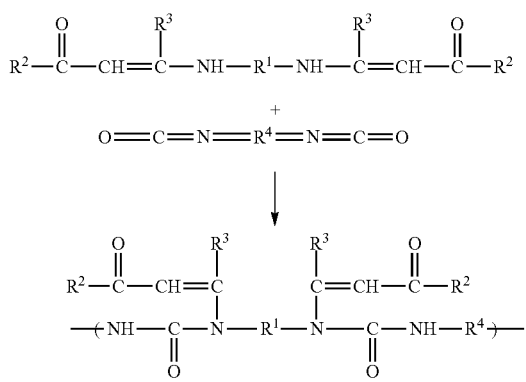

The $R^1$ group may contain additional reactive amines, including —NH—$CR^3$=CH—CO—$R^2$, and/or the $R^4$ group may contain additional isocyanate groups to form a crosslinked polymer. Combinations of multiple reactants may be used, and, thus, the R groups may be different in different repeat units of the polymer.

Suitable polyureas made from aminocrotonates, and processes for forming such polyureas, are further disclosed, for example in U.S. Pat. No. 9,051,489 to Verborgt et al., the entire disclosure of which is hereby incorporated herein by reference.

Golf Ball Compositions

Polyurea golf ball compositions of the present invention optionally include one or more types of fillers, to alter rheological and mixing properties, specific gravity (e.g., density-modifying fillers), modulus, tear strength, reinforcement, or the like. Suitable fillers are typically inorganic, and include, but are not limited to, metals, metal oxides, and metal salts (e.g., zinc oxide, tin oxide, calcium oxide, barium sulfate, zinc sulfate, calcium carbonate, zinc carbonate, barium carbonate, clay, tungsten, tungsten carbide, silica, regrind (i.e., recycled core material typically ground to about 30 mesh particle size), high Mooney viscosity rubber regrind, and combinations of two or more thereof.

Polyurea golf ball compositions of the present invention may also include one or more additives selected from UV absorbers and light stabilizers, wetting agents, coloring agents, optical brighteners, crosslinking agents, whitening agents (e.g., $TiO_2$, ZnO, etc.), defoaming agents, processing aids, surfactants, and other conventional additives. The optional additive(s) may be added to the reaction product of the prepolymer and the amine compound or to the prepolymer prior to the reaction.

In a particular embodiment, the polyurea golf ball composition includes a UV absorber in an amount of from 2 or 3 or 4 or 5 wt % to 6 or 8 or 10 wt %, based on the total weight of the polyurea composition. Suitable UV absorbers include, but are not limited to, triazines, benzoxazinones, benzotriazoles, benzophenones, benzoates, formamidines, cinnamates/propenoates, aromatic propanediones, benzimidazoles, cycloaliphatic ketones, formanilides, cyanoacrylates, benzopyranones, salicylates, substituted acrylonitriles, and combinations thereof. Suitable UV absorbers also include, but are not limited to, inorganic pigments such as titanium dioxide, zinc oxide, barium sulfate, violet, Paliogen® Blue L 6385 indanthrone blue pigment, ultra marine blue, and other blue pigments; and combinations of two or more thereof. In a particular aspect of this embodiment, the golf ball composition includes a benzotriazole UV absorber selected from: 2-(2H-benzotriazol-2-yl)-4-(1,1,3,3-tetramethylbutyl)phenol; 2-(5-chloro-2H-benzotriazole-2-yl)-6-(1,1-dimethylethyl)-4-methylphenol; 2-(2H-benzotriazol-2-yl)-6-dodecyl-4-methylphenol; 2-(2H-benzotriazol-2-yl)-4,6-bis(1-methyl-1-phenylethyl)phenol; 2-(5-chloro-2H-benzotriazole-2-yl)-6-(1,1-dimethylethyl)-4-methylphenol; 2-(2H-benzotriazol-2-yl)-4,6-ditertpentylphenol; and 2-(2H-benzotriazol-2-yl)-6-(1-methyl-1-phenylethyl)-4-(1,1,3,3-tetramethylbutyl)-phenol. In another particular aspect of this embodiment, the golf ball composition includes a UV absorber wherein the UV absorber is 2-(2H-benzotriazol-2-yl)-4-(1,1,3,3-tetramethylbutyl)phenol.

Preferred substituted triazine UV absorbers include those having the formula:

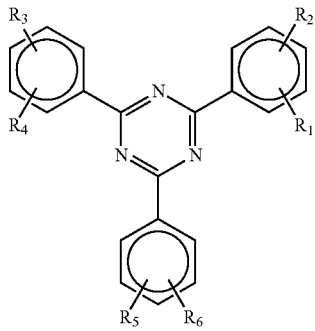

wherein $R_1$ is H, OH; $R_2$ is H, alkoxy, alkylester, hydroxyalkoxy; $R_3$ is alkyl, H; $R_4$ is alkyl, H, alkylester; $R_5$ is alkyl, H; and $R_6$ is alkyl, H, alkylester.

Preferred benzoxazinone UV absorbers include those having the formula:

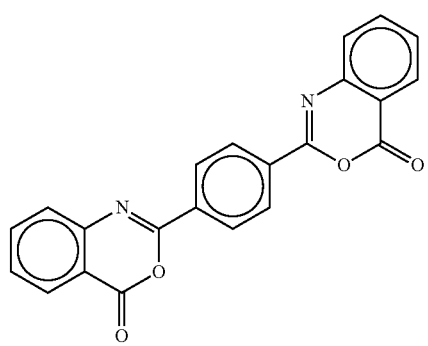

Preferred benzotriazole UV absorbers include those having the formula:

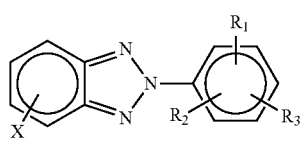

wherein $R_1$ is OH; $R_2$ is alkyl, hydroxyalkyl, acryloxyalkyl, (hydroxyphenyl)alkyl, (alkylester)alkyl, (hydroxyalkylether)oxoalkyl, phenylalkyl; $R_3$ is H, alkyl; and X is Cl, Br, I. Preferably X is Cl.

Preferred benzophenone UV absorbers include those having the formula:

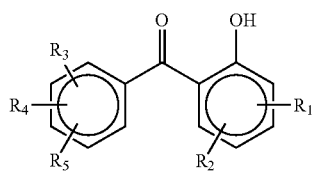

wherein $R_1$ is OH, alkoxy, alkenoic acid alkoxyester, aryloxy, hydroxyalkoxy, hydroxy(alkylether)alkoxy, (polymerized acrylo)alkoxyester, o-alkyl acid ester; $R_2$ is H, $SO_3H$, $SO_3Na$; and $R_3$ is H, OH; $R_4$ is H, alkoxy, OH; and $R_5$ is H, $SO_3Na$.

Preferred benzoate UV absorbers include those having the formula:

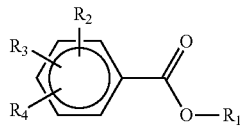

wherein $R_1$ is hydroxyalkylether, alkylphenyl, alkyl, phenyl, hydroxyphenyl; $R_2$ is H, OH, alkyl, hydroxy(alkylether) amino; $R_3$ is H, alkyl, OH; and $R_4$ is H, alkyl.

Preferred formamidine UV absorbers include those having the formula:

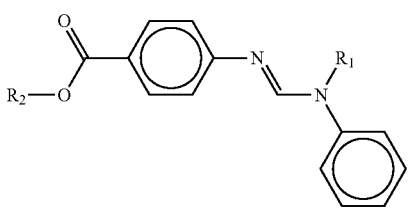

wherein $R_1$ is alkyl, $R_2$ is alkyl.

Preferred cinnamate or propenoate UV absorbers include those having the formula:

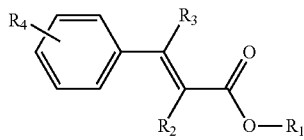

wherein $R_1$ is alkyl; $R_2$ is alkylester, cyano; $R_3$ is H, phenyl; and $R_4$ is H, alkoxy.

Preferred aromatic propanedione UV absorbers include those having the formula:

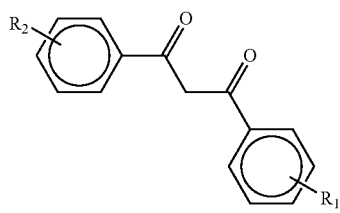

wherein $R_1$ is alkoxy; and $R_2$ is alkyl.

Preferred benzimidazole UV absorbers include those having the formula:

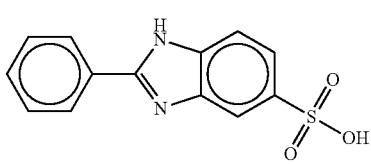

Preferred cycloaliphatic ketone UV absorbers include those having the formula:

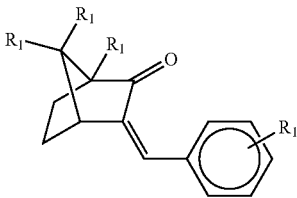

wherein $R_1$ is alkyl.

Preferred formanilide UV absorbers (including oxamides) include those having the formula:

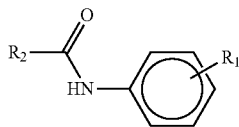

wherein $R_1$ is alkyl; $R_2$ is H, formanilide, alkylalkoxy, and/or contains benzimidazole.

Preferred cyanoacrylate UV absorbers include those having the formula:

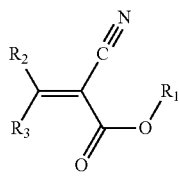

wherein $R_1$ is alkyl, arylcyanoacrylalkyl; $R_2$ is phenyl, H, alkylindoline; and $R_3$ is H, phenyl.

Preferred benzopyranone UV absorbers include those having the formula:

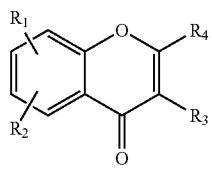

wherein $R_1$; $R_2$; $R_3$; and $R_4$ are OH.

Preferred salicylate UV absorbers include those having the formula:

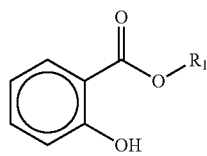

wherein $R_1$ is a linear, cyclic, or branched alkyl group.

Non-limiting examples of suitable commercially available UV absorbers and light stabilizers are Tinuvin®, Uvinul®, and Chimassorb® ultraviolet light absorbers, e.g., Tinuvin® 329 2-(2H-benzotriazol-2-yl)-4-(1,1,3,3-tetramethylbutyl)phenol, Tinuvin® 326 2-(5-chloro-2H-benzotriazole-2-yl)-6-(1,1-dimethylethyl)-4-methylphenol, Tinuvin® 571 2-(2H-benzotriazol-2-yl)-6-dodecyl-4-methylphenol, Uvinil® P25 4-bis(polyethoxy) paraaminobenzoic acid polyethoxyethyl ester, Tinuvin® 213 reaction product of methyl 3-(3-(2H-benzotriazole-2-yl)-5-t-butyl-4-hydroxyphenyl) propionate/PEG 300, Uvinil® 3039 (2-ethylhexyl)-2-cyano-3,3-diphenylacrylate, Uvinil® 3030 1,3-bis-[(2'-cyano-3',3'-diphenylacryloyl)oxy]-2,2-bis-{[(2'-cyano-3',3'-diphenylacryloyl)oxy]methyl}-propane, Uvinil® 3035 ethyl-2-cyano-3,3-diphenylacrylate, Uvinil® 3049 2,2-Dihydroxy-4,4-dimethoxybenzophenone, Tinuvin® P 2-(2H-benzotriazol-2-yl)-p-cresol, Chimassorb® 81 benzophenone UV absorber, Tinuvin® 460 a hydroxyphenyl-triazine UV absorber, Tinuvin® Carboprotect® a red-shifted benzotriazole-based UV absorber, Tinuvin® 328 2-(2H-benzotriazol-2-yl)-4,6-ditertpentylphenol, and Tinuvin® 928 (2-(2H-benzotriazol-2-yl)-6-(1-methyl-1-phenylethyl)-4-(1,1,3,3-tetramethylbutyl)-phenol, commercially available from BASF; Cyasorb® light stabilizers, commercially available from Cytec Industries Inc.; Hostavin® light stabilizers, commercially available from Clariant Corporation; Maxgard® UV stabilizers, commercially available from Syrgis; Seesorb UV absorbers, commercially available from Shipro Kasei Kaisha; Mark® organo based stabilizers, commercially available from Chemtura; Givsorb® UV absorbers, commercially available from Givaudan Corporation; Neo Heliopan® UV absorbers, commercially available from Symrise AG; Irgafos® UV absorbers, e.g., Irgafos® 168 tris(2,4-ditert-butylphenyl)phosphite UV absorber, commercially available from Ciba®; Uvasorb® UV filters, e.g., Uvasorb® S34 2-(2H-Benzotriazol-2-yl)-4,6-bis(1-methyl-1-phenylethyl)phenol and Uvasorb® S26 2-(5-chloro-2H-benzotriazole-2-yl)-6-(1,1-dimethylethyl)-4-methylphenol, commercially available from 3V Inc.; UV-Check® UV light stabilizers, e.g., UV-Check® AM-300 2-hydroxy-4-(octyloxy)benzophenone and UV-Check® AM-340 2,4 di-tert-butylphenyl 3,5-di-tert-butyl-4-hyroxybenzoate, commercially available from Ferro Corporation; and Songlight® hindered amine light stabilizers, e.g., Songlight® 2920 LQ bis(1,2,2,6,6-pentamethyl-4-piperidyl) sebacate, commercially available from Songwon Chemical.

Golf Ball Construction

Polyurea compositions of the present invention are not limited by the use of the composition in a particular golf ball construction, and can be used to form a cover layer in a variety of golf ball constructions. For example, the compositions are suitable for use in two-piece, multi-layer, and wound golf balls, having a variety of core structures, intermediate layers, covers, and coatings.

Core Materials

Cores of the golf balls formed according to the invention may be solid, semi-solid, hollow, fluid-, powder-, or gas-filled, and may be one-piece or multi-layered. Multilayer cores include a center, innermost portion, which may be solid, semi-solid, hollow, fluid-, powder-, or gas-filled, surrounded by at least one outer core layer. The outer core layer may be solid, or it may be a wound layer formed of a tensioned elastomeric material. For purposes of the present disclosure, the term "semi-solid" refers to a paste, a gel, or the like.

Particularly suitable core materials include, but are not limited to, thermosetting materials, such as styrene butadiene, polybutadiene, isoprene, polyisoprene, and trans-isoprene; thermoplastics, such as ionomer resins, polyamides and polyesters; and thermoplastic and thermosetting polyurethane and polyureas. Particularly preferred core compositions are thermosetting rubber compositions comprising a base polymer, an initiator agent, a coagent and/or a curing agent, and optionally one or more of a metal oxide, metal fatty acid or fatty acid, antioxidant, soft and fast agent, fillers, and additives. Suitable base polymers include natural and synthetic rubbers including, but not limited to, polybutadiene, polyisoprene, ethylene propylene rubber ("EPR"), styrene-butadiene rubber, styrenic block copolymer rubbers (such as SI, SIS, SB, SBS, SIBS, and the like, where "S" is styrene, "I" is isobutylene, and "B" is butadiene), butyl rubber, halobutyl rubber, polystyrene elastomers, polyethylene elastomers, polyurethane elastomers, polyurea elastomers, metallocene-catalyzed elastomers and plastomers, copolymers of isobutylene and para-alkylstyrene, halogenated copolymers of isobutylene and para-alkylstyrene, acrylonitrile butadiene rubber, polychloroprene, alkyl acrylate rubber, chlorinated isoprene rubber, acrylonitrile chlorinated isoprene rubber, polyalkenamers, and combinations of two or more thereof. Suitable initiator agents include organic peroxides, high energy radiation sources capable of generating free radicals, C—C initiators, and combinations thereof. Suitable coagents include, but are not limited to, metal salts of unsaturated carboxylic acids; unsaturated vinyl compounds and polyfunctional monomers (e.g., trimethylolpropane trimethacrylate); phenylene bismaleimide; and combinations thereof. Suitable curing agents include, but are not limited to, sulfur; N-oxydiethylene 2-benzothiazole sulfenamide; N,N-di-ortho-tolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof. Suitable types and amounts of base polymer, initiator agent, coagent, filler, and additives are more fully described in, for example, U.S. Pat. Nos. 6,566,483, 6,695,718, 6,939,907, 7,041,721 and 7,138,460, the entire disclosures of which are hereby incorporated by reference. Particularly suitable diene rubber compositions are further disclosed, for example, in U.S. Patent Application Publication No. 2007/0093318, the entire disclosure of which is hereby incorporated herein by reference.

Cover Materials

Golf balls formed according to the invention include at least one cover layer comprising a polyurea composition of the present invention, and optionally include one or more cover layers formed from a known cover material. Suitable known cover materials include, but are not limited to, conventional polyurethanes, polyureas, and hybrids of polyurethane and polyurea; ionomer resins and blends thereof (e.g., Surlyn® ionomer resins and DuPont® HPF 1000 and HPF 2000, commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; non-ionomeric acid copolymers, e.g., ethylene (meth)acrylic acid; plastomers; flexomers; styrene/butadiene/styrene block copolymers; styrene/ethylene-butylene/styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax® thermoplastic polyether and polyester amides, commercially available from Arkema Inc; crosslinked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations of two or more thereof. A particularly preferred inner cover layer material is an ionomer composition comprising a blend of Surlyn® 7940/Surlyn® 8940, optionally including a melt flow modifier.

Suitable conventional polyurethanes and polyureas are further disclosed, for example, in U.S. Pat. Nos. 5,334,673, 5,484,870, 6,506,851, 6,756,436, 6,835,794, 6,867,279, 6,960,630, and 7,105,623; U.S. Patent Application Publication No. 2009/0011868; and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed, for example, in U.S. Patent Application Publication No. 2007/0117923, the entire disclosure of which is hereby incorporated herein by reference.

Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

In a particular embodiment, the cover comprises an inner cover layer formed from an ionomer composition and an outer cover layer formed from a polyurea composition of the present invention.

Coating

Golf balls are typically finished by applying one or more finishing coats over the cover. For example, a primer and a topcoat may be applied. Either or both of the primer and topcoat compositions may be pigmented or clear. Several coats of clear or pigmented coatings may be applied.

Primer compositions are typically a solvent-borne or water-borne material, particularly selected from, but not limited to, polyurethanes, polyureas, acrylic polyurethanes, polyesters, polyester acrylics, and epoxies. In a particular embodiment, the primer composition is a two-part solvent-borne polyurethane comprising a resin component and an isocyanate component. In a particular aspect of this embodiment, the isocyanate component is present in an amount of from 31 parts to 35 parts, by weight per 100 parts of the resin component. In another particular aspect of this embodiment, the resin component comprises from 50 to 58 wt % solids and the isocyanate component comprises from 46 to 53 wt % solids. In another particular aspect of this embodiment, the resin component is SPU69723D from PPG Industries and the isocyanate component is GXH69725 from PPG Industries.

Topcoat compositions are typically a solvent-borne material particularly selected from, but not limited to, polyurethanes, polyureas, acrylic polyurethanes, polyesters, polyester acrylics, and epoxies. In a particular embodiment, the topcoat composition is a two-part solvent-borne polyurethane comprising a resin component and an isocyanate component. In a particular aspect of this embodiment, the isocyanate component is present in an amount of from 68 parts to 71 parts, by weight per 100 parts of the resin component. In another particular aspect of this embodiment, the resin component comprises from 46 to 52 wt % solids and the isocyanate component comprises from 46 to 53 wt % solids. In another particular aspect of this embodiment, the resin component is SPU61369K from PPG Industries and the isocyanate component is GXH69725 from PPG Industries.

Primer and topcoat compositions optionally include additives including, but not limited to, pigments, tints, dyes, fillers, reaction enhancers or catalysts, crosslinking agents, optical brighteners, propylene carbonates, such as those disclosed in U.S. Pat. No. 5,840,788, which is incorporated in its entirety by reference herein, coloring agents, fluorescent agents, whitening agents, UV absorbers, hindered amine light stabilizers, defoaming agents, processing aids, mica, talc, nano-fillers, wetting agents, solvents, and other conventional additives.

Non-limiting examples of suitable coatings are further disclosed, for example, in U.S. Pat. Nos. 5,409,233; 5,459,220; 5,494,291; 5,820,491; 5,669,831; 5,817,735; and 7,935,421, the entire disclosure of which are hereby incorporated herein by reference In a particular embodiment, golf balls of the present invention comprise at least one coat of primer and at least one coat of topcoat. In a particular aspect of this embodiment, the primer is a solvent-borne composition and the topcoat is a solvent-borne composition.

Component Dimensions

Dimensions of golf ball components, i.e., thickness and diameter, may vary depending on the desired properties.

Golf ball cores of the present invention include single, dual, and multilayer cores, and preferably have an overall diameter of 0.75 inches or 1.00 inch or 1.25 inches or 1.40 inches or 1.50 inches or 1.51 inches or 1.55 inches or 1.60 inches or 1.62 inches or 1.63 inches or 1.65 inches or a diameter within a range having a lower limit and an upper limit selected from these values.

In a particular embodiment, the core is a solid, single layer having a diameter of 0.750 or 1.000 or 1.100 or 1.150 or 1.200 or 1.250 or 1.300 or 1.400 or 1.500 or 1.510 or 1.530 or 1.550 or 1.600 or 1.620 or 1.630 or 1.650 inches or a diameter within a range having a lower limit and an upper limit selected from these values. In a particular aspect of this embodiment, the core has a center Shore C hardness of 95 or less, or 90 or less, or 85 or less, or 80 or less, or a center Shore C hardness within a range having a lower limit of 20 or 25 or 30 or 35 or 40 or 45 or 50 or 55 or 60 or 65 or 70 or 75 and an upper limit of 60 or 65 or 70 or 75 or 80 or 83 or 85 or 90 or 95, wherein the upper limit is greater than the lower limit (e.g., when the lower limit is 65, the upper limit is 70, 75, 80, 83, 85, 90, or 95). In another particular aspect of this embodiment, the core has an outer surface Shore C hardness of 50 or greater, or 55 or greater, or 60 or greater, or 65 or greater, or 70 or greater, or an outer surface Shore C hardness within a range having a lower limit of 40 or 45 or 50 or 55 or 60 or 65 or 70 or 74 and an upper limit of 60 or 65 or 70 or 74 or 75 or 78 or 80 or 85 or 90 or 95, wherein the upper limit is greater than the lower limit (e.g., when the lower limit is 65, the upper limit is 70, 74, 75, 78, 80, 85, 90, or 95). In another particular aspect of this embodiment, the core has a low negative, low positive, or zero hardness gradient. In another particular aspect of this embodiment, the core is formed from a substantially homogeneous formulation and has a hardness gradient wherein the Shore C hardness of the outer surface minus the Shore C hardness of the center of the core is within a range having a lower limit of −8 or −5 or −3 or 0 and an upper limit of 0 or 3 or 5 or 8.

In another particular aspect of this embodiment, the core has an Atti compression of 100 or less, or 90 or less, or 80 or less, or 75 or less, or 70 or less, or an Atti compression within a range having a lower limit of 50 or 55 or 60 or 65 and an upper limit of 65 or 70 or 75 or 80 or 90 or 100.

In another particular embodiment, the core comprises an inner core layer and an outer core layer, the inner core layer having a diameter of 0.750 or 0.900 or 0.910 or 0.920 or 0.930 or 0.940 or 0.950 or 0.960 or 0.970 or 0.980 or 0.990 or 1.000 or 1.010 or 1.020 or 1.030 or 1.040 or 1.050 or 1.060 or 1.070 or 1.080 or 1.090 or 1.100 or 0.110 or 1.120 or 1.130 inches or a diameter within a range having a lower limit and an upper limit selected from these values, and the outer core having a thickness of 0.050 or 0.100 or 0.200 or 0.250 or 0.280 or 0.310 or 0.440 or 0.450 or 0.500 inches or a thickness within a range having a lower limit and an upper limit selected from these values. In a particular aspect of this embodiment, the inner core layer has a center Shore C hardness of 95 or less, or 90 or less, or 85 or less, or 80 or less, or 75 or less, or a center Shore C hardness within a range having a lower limit of 20 or 25 or 30 or 35 or 40 or 45 or 50 or 55 or 60 or 65 or 70 or 75 and an upper limit of 60 or 65 or 70 or 75 or 80 or 83 or 85 or 90 or 95, wherein the upper limit is greater than the lower limit (e.g., when the lower limit is 65, the upper limit is 70, 75, 80, 83, 85, 90, or 95). In another particular aspect of this embodiment, the inner core layer has an outer surface Shore C hardness of 50 or greater, or 55 or greater, or 60 or greater, or 65 or greater, or an outer surface Shore C hardness within a range having a lower limit of 40 or 45 or 50 or 55 or 60 or 65 or 70 or 74 and an upper limit of 60 or 65 or 70 or 74 or 75 or 78 or 80 or 85 or 90 or 95, wherein the upper limit is greater than the lower limit (e.g., when the lower limit is 65, the upper limit is 70, 74, 75, 78, 80, 85, 90, or 95). In another particular aspect of this embodiment, the inner core layer has a negative or zero hardness gradient. In another particular aspect of this embodiment, the inner core layer is formed from a substantially homogeneous formulation and has a hardness gradient wherein the Shore C hardness of the outer surface minus the Shore C hardness of the center of the core is within a range of from −20 or −15 or −10 to −10 or −5 or 0. In another particular aspect of this embodiment, the inner core layer has an Atti compression of 65 or less, or 60 or less, or 50 or less, or 40 or less, or 30 or less, or an Atti compression within a range having a lower limit of 10 or 15 or 20 or 25 and an upper limit of 25 or 30 or 40 or 50 or 60 or 65. In another particular aspect of this embodiment, the outer core layer has an outer surface Shore C hardness within a range having a lower limit of 70 or greater, or 75 or greater, or 80 or greater, or 85 or greater, or 89 or greater, or an outer surface Shore C hardness within a range having a lower limit of 70 or 75 or 80 or 85 or 89 and an upper limit of 80 or 85 or 90 or 93 or 95, wherein the upper limit is greater than the lower limit (e.g., when the lower limit is 85, the upper limit is 90, 93, or 95). In another particular aspect of this embodiment, the core has an overall dual core compression within a range having a lower limit of 60 or 70 or 80 or 85 and an upper limit of 85 or 90 or 95.

Golf ball covers of the present invention include single, dual, and multilayer covers, and preferably have an overall thickness of 0.03 inches or 0.04 inches or 0.045 inches or 0.05 inches or 0.06 inches or 0.07 inches or 0.08 inches or 0.09 inches or 0.10 inches or an overall thickness within a range having a lower limit and an upper limit selected from these values. Dual and multilayer covers have an inner cover layer and an outer cover layer, and multilayer covers additionally have at least one intermediate cover layer disposed between the inner cover layer and the outer cover layer. In a particular embodiment, the cover is a single layer having a thickness within a range having a lower limit of 0.020 or 0.025 or 0.030 inches and an upper limit of 0.030 or 0.040 or 0.045 or 0.050 or 0.070 or 0.100 or 0.120 or 0.150 or 0.350 or 0.400 or inches. In another particular embodiment, the cover comprises an inner cover layer and an outer cover layer, the inner cover having a thickness within a range having a lower limit of 0.020 or 0.025 or 0.030 or 0.035 inches and an upper limit of 0.035 or 0.040 or 0.045 or 0.050 or 0.100 inches, and the outer cover having a thickness within a range having a lower limit of 0.020 or 0.025 or 0.030 inches and an upper limit of 0.035 or 0.040 or 0.045 or 0.050 inches.

The present invention is not limited by any particular dimple pattern, dimple plan shape, dimple cross-sectional profile, or dimple size. Examples of suitable dimple patterns include, but are not limited to, phyllotaxis-based patterns; polyhedron-based patterns; and patterns based on multiple copies of one or more irregular domain(s) as disclosed in U.S. Pat. No. 8,029,388, the entire disclosure of which is hereby incorporated herein by reference; and particularly dimple patterns suitable for packing dimples on seamless golf balls. Non-limiting examples of suitable dimple patterns are further disclosed in U.S. Pat. Nos. 7,927,234, 7,887,439, 7,503,856, 7,258,632, 7,179,178, 6,969,327, 6,702,696, 6,699,143, 6,533,684, 6,338,684, 5,842,937, 5,562,552, 5,575,477, 5,957,787, 5,249,804, 5,060,953, 4,960,283, and 4,925,193, and U.S. Patent Application Publication Nos. 2006/0025245, 2011/0021292, 2011/0165968, and 2011/0183778, the entire disclosures of which are hereby incorporated herein by reference. Non-limiting examples of seamless golf balls and methods of producing such are further disclosed, for example, in U.S. Pat. Nos. 6,849,007 and 7,422,529, the entire disclosures of which are hereby incorporated herein by reference. In a particular embodiment, the dimple pattern is based on a spherically tiled tetrahedron. The dimples may have a variety of shapes and sizes including different depths and perimeters. In particular, the dimples may be concave hemispheres, or they may be triangular, square, hexagonal, catenary, polygonal or any other shape known to those skilled in the art. They may also have a cross-sectional profile based on any known dimple profile shape including, but not limited to, parabolic curves, ellipses, spherical curves, saucer-shapes, sine curves, truncated cones, flattened trapezoids, and catenary curves.

Golf balls of the present invention typically have a dimple count within a limit having a lower limit of 250 and an upper limit of 350 or 400 or 450 or 500. In a particular embodiment, the dimple count is 252 or 272 or 302 or 312 or 320 or 328 or 332 or 336 or 340 or 352 or 360 or 362 or 364 or 372 or 376 or 384 or 390 or 392 or 432.

By the present invention, it has been found that finishing golf balls with a particular coating system comprising a solventborne primer coat and a solventborne top coat as disclosed herein can improve aerodynamic properties compared to golf balls finished with a coating system comprising a waterborne primer coat and a solventborne top coat. For example, it has been found that with solventborne systems, the effective edge angle of the dimples is increased by about 0.5-0.75°, while the edge radius is decreased by about 0.005-0.010 inches, relative to waterborne systems. Thus, for the same edge angle, the solventborne system of the present invention exhibits improved stability.

In a particular embodiment, the present invention is directed to a golf ball comprising an inner core layer formed from a diene rubber composition and having a diameter of from 0.750 inches to 1.100 inches, an Atti compression of 60 or less, a center Shore C hardness of from 55 to 85, a surface Shore C hardness of from 50 to 80, and a zero hardness gradient or a negative hardness gradient wherein the difference between the Shore C hardness of the outer surface of the inner core layer and the Shore C hardness of the center of the inner core layer is 15 or less; an outer core layer formed from a diene rubber composition and having a thickness of from 0.250 inches to 0.450 inches, and an outer surface Shore C hardness of from 70 to 95; an inner cover layer formed from an ionomer composition and having a thickness of from 0.020 inches to 0.050 inches, and an outer surface Shore C hardness of 85 or greater; and an outer cover layer formed from a polyurea composition of the present invention, and having a thickness of from 0.020 inches to 0.050 inches and an outer surface Shore C hardness of from 65 to 95. In a particular aspect of this embodiment, the golf ball additionally comprises a pigmented solvent-borne primer coat and a solvent-borne topcoat.

In another particular embodiment, the present invention is directed to a golf ball comprising a solid, single-layer core formed from a diene rubber composition and having a diameter of from 1.500 inches to 1.550 inches, an Atti compression of from 50 to 100, a center Shore C hardness of from 60 to 85, a surface Shore C hardness of from 60 to 85, and a zero hardness gradient or a negative or positive hardness gradient wherein the difference between the Shore C hardness of the outer surface of the core and the Shore C hardness of the center of the core is 8 or less; an inner cover layer formed from an ionomer composition and having a thickness of from 0.030 inches to 0.050 inches, and an outer surface Shore C hardness of 85 or greater; and an outer cover layer formed from a polyurea composition of the present invention, and having a thickness of from 0.020 inches to 0.050 inches and an outer surface Shore C hardness of from 65 to 95. In a particular aspect of this embodiment, the golf ball additionally comprises a pigmented solvent-borne primer coat and a solvent-borne topcoat.

For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising:
    an inner core layer formed from a diene rubber composition and having a diameter of from 0.750 inches to 1.100 inches, an Atti compression of 60 or less, a center Shore C hardness of from 55 to 85, a surface Shore C hardness of from 50 to 80, and a zero hardness gradient or a negative or positive hardness gradient wherein the difference between the Shore C hardness of the outer surface of the inner core layer and the Shore C hardness of the center of the inner core layer is 15 or less;
    an outer core layer formed from a diene rubber composition and having a thickness of from 0.250 inches to 0.450 inches and an outer surface Shore C hardness of from 70 to 95;
    an inner cover layer formed from an ionomer composition and having a thickness of from 0.020 inches to 0.050 inches and an outer surface Shore C hardness of 85 or greater; and
    an outer cover layer formed from a polyurea composition and having a thickness of from 0.020 inches to 0.050 inches and an outer surface Shore C hardness of from 65 to 95;
    wherein the polyurea outer cover layer composition comprises a reaction product of a polyisocyanate prepolymer and an amine compound having the formula:

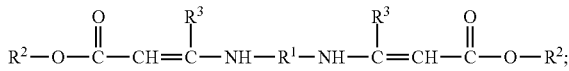

wherein $R^1$ is an organic group;
    wherein $R^2$ is an aliphatic group; and
    wherein $R^3$ is an aliphatic group.

2. The golf ball of claim 1, wherein the compound has the formula:

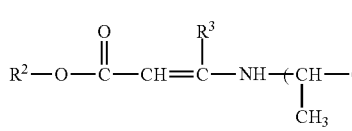

wherein R is —H or —$CH_2$—$CH_3$; and
    wherein n, x, y, and z are nonnegative numbers.

3. The golf ball of claim 1, wherein $R^3$ is methyl, and wherein $R^2$ is selected from the group consisting of ethyl, methyl, and t-butyl.

4. The golf ball of claim 1, wherein the polyisocyanate prepolymer is a polyurea prepolymer comprising a reaction product of an amine-terminated compound and an excess amount of an isocyanate, and wherein the isocyanate is selected from the group consisting of isophorone diisocyanate; 1,6-hexamethylene diisocyanate; 4,4'-dicyclohexylmethane diisocyanate; 4,4'-diphenylmethane diisocyanate; toluene diisocyanate; and homopolymers and copolymers thereof.

5. The golf ball of claim 1, wherein the polyisocyanate prepolymer is a polyurethane prepolymer comprising a reaction product of a polyol and an excess amount of an isocyanate, and wherein the isocyanate is selected from the group consisting of isophorone diisocyanate; 1,6-hexamethylene diisocyanate; 4,4'-dicyclohexylmethane diisocyanate; 4,4'-diphenylmethane diisocyanate; toluene diisocyanate; and homopolymers and copolymers thereof.

6. The golf ball of claim 1, wherein the polyurea outer cover layer composition additionally comprises from 2 wt % to 8 wt %, based on the total weight of the polyurea composition, of a benzotriazole UV absorber.

7. A golf ball comprising:
    a solid, single-layer core formed from a diene rubber composition and having a diameter of from 1.500 inches to 1.550 inches, an Atti compression of from 50 to 100, a center Shore C hardness of from 60 to 85, a surface Shore C hardness of from 60 to 85, and a zero hardness gradient or a negative or positive hardness gradient wherein the difference between the Shore C hardness of the outer surface of the core and the Shore C hardness of the center of the core is 8 or less;
    an inner cover layer formed from an ionomer composition and having a thickness of from 0.030 inches to 0.050 inches and an outer surface Shore C hardness of 85 or greater;
    an outer cover layer formed from a polyurea composition and having a thickness of from 0.020 inches to 0.050 inches and an outer surface Shore C hardness of from 65 to 95;
    wherein the polyurea outer cover layer composition comprises a reaction product of a polyisocyanate prepolymer and an amine compound having the formula:

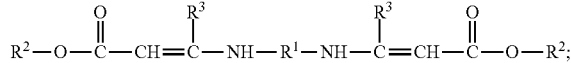

wherein $R^1$ is an organic group;
    wherein $R^2$ is an aliphatic group; and
    wherein $R^3$ is an aliphatic group.

8. The golf ball of claim 7, wherein the compound has the formula:

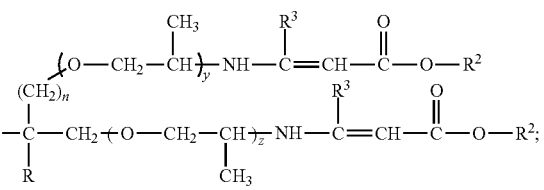

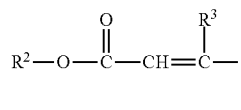 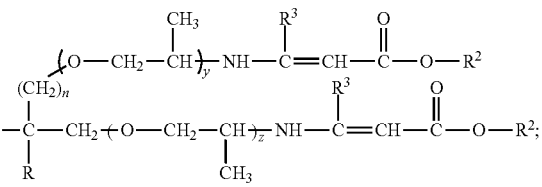

wherein R is —H or —CH$_2$—CH$_3$; and
wherein n, x, y, and z are nonnegative numbers.

9. The golf ball of claim 7, wherein R$^3$ is methyl, and wherein R$^2$ is selected from the group consisting of ethyl, methyl, and t-butyl.

10. The golf ball of claim 7, wherein the polyisocyanate prepolymer is a polyurea prepolymer comprising a reaction product of an amine-terminated compound and an excess amount of an isocyanate, and wherein the isocyanate is selected from the group consisting of isophorone diisocyanate; 1,6-hexamethylene diisocyanate; 4,4'-dicyclohexylmethane diisocyanate; 4,4'-diphenylmethane diisocyanate; toluene diisocyanate; and homopolymers and copolymers thereof.

11. The golf ball of claim 7, wherein the polyisocyanate prepolymer is a polyurethane prepolymer comprising a reaction product of a polyol and an excess amount of an isocyanate, and wherein the isocyanate is selected from the group consisting of isophorone diisocyanate; 1,6-hexamethylene diisocyanate; 4,4'-dicyclohexylmethane diisocyanate; 4,4'-diphenylmethane diisocyanate; toluene diisocyanate; and homopolymers and copolymers thereof.

12. The golf ball of claim 7, wherein the polyurea outer cover layer composition additionally comprises from 2 wt % to 8 wt %, based on the total weight of the polyurea composition, of a benzotriazole UV absorber.

* * * * *